UNITED STATES PATENT OFFICE.

JORGEN GEORG MAARDT, OF COPENHAGEN, DENMARK.

ARTIFICIAL MARBLE.

SPECIFICATION forming part of Letters Patent No. 483,565, dated October 4, 1892.

Application filed September 24, 1890. Serial No. 366,006. (No specimens.)

*To all whom it may concern:*

Be it known that I, JORGEN GEORG MAARDT, a subject of the King of Denmark, residing at Copenhagen, in the Kingdom of Denmark, have invented certain new and useful Improvements in Artificial Marble; and I do hereby declare the following to be a full, clear, and exact description of the invention, such as will enable others skilled in the art to which it appertains to make and use the same.

The subject of the present invention consists in a kind of cement which I term "artificial marble," and which is prepared in the form of a pulverized mass mixed with water and designed for application to the surface of masonry. The dressing thus formed is smoothened with a glass or steel smoother, whereupon a marble-like surface is produced which is insoluble in water and is inattacked by frost and capable of resisting the action of acids. The surface thus formed may be ornamented or colored by any mineral pigment, the color being applied while the surface is wet, by which means a more durable result is obtained.

The artificial marble, in addition to its use as a dressing for masonry, may also be employed for manufacturing rods, blocks, flags, or figures.

The preparation is made as follows: Ten parts of burnt gypsum ($S_3CaH$) or ($S_3CaHSi_2-Al_3Fe_3$) and one part of potash alum are mixed with water, formed into stones, and burned, after which it is broken up and powdered. This pulverized mass is then mixed with the following substances in the proportions given: twenty-two per cent. of the above-mentioned pulverized mass, twenty-two per cent. magnesite, ($MgCO_3$,) eleven per cent. magnesium chloride, ($MgCl_2$,) forty-four per cent. burnt and powdered silica, (flint,) ($SiO_2$,) one per cent. potash alum, ($KAl2(SO_4)+12H_2O$.) This mixture when stirred up with water produces the improved artificial marble. The product of plaster-of-paris, potash alum, and water must be burned and pulverized before adding the magnesite, magnesium chloride, magnesium silicate, and potash alum, because the magnesite, magnesium chloride, magnesium silicate, &c., if it were burned together with the plaster-of-paris, would not harden sufficiently rapid afterward.

Having now particularly described and ascertained the nature of my invention and in what manner the same is to be performed, I declare that what I claim is—

The herein-described composition of matter, which forms the artificial marble, consisting of burnt gypsum, potash alum, ($KAl2(SO_4)+12H_2O$,) magnesite, ($MgCO_3$,) magnesium chloride, ($MgCl_2$,) burnt flint, ($SiO_2$,) and water, in the proportions specified.

In testimony whereof I affix my signature in presence of two witnesses.

JORGEN GEORG MAARDT.

Witnesses:
 LAURITZ NIELSEN,
 WILLY DRÜCKHAMMER.